(12) United States Patent
Sugiyama (10) Patent No.: US 7,271,725 B2
(45) Date of Patent: Sep. 18, 2007

(54) CUSTOMER SERVICE ROBOT

(75) Inventor: Kenichiro Sugiyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 259 days.

(21) Appl. No.: 11/167,209

(22) Filed: Jun. 28, 2005

(65) Prior Publication Data

US 2006/0004487 A1 Jan. 5, 2006

(30) Foreign Application Priority Data

Jun. 30, 2004 (JP) ............................. 2004-193755

(51) Int. Cl.
*G08B 13/14* (2006.01)
*B60R 25/06* (2006.01)
*G06F 19/00* (2006.01)
*E05B 53/00* (2006.01)

(52) U.S. Cl. .................. 340/572.1; 340/5.73; 340/542; 340/932.2; 70/263; 700/245; 235/384; 318/568.16; 901/1

(58) Field of Classification Search ............. 340/572.1; 700/245
See application file for complete search history.

(56) References Cited

U.S. PATENT DOCUMENTS 6,584,375 B2 * 6/2003 Bancroft et al. ............ 700/213
7,147,154 B2 * 12/2006 Myers et al. ................ 235/383
7,191,035 B2 * 3/2007 Okamoto et al. ........... 700/245
2002/0165638 A1 * 11/2002 Bancroft et al. ............ 700/213
2006/0217837 A1 * 9/2006 Koga et al. ................. 700/245
2006/0293792 A1 * 12/2006 Hasegawa et al. .......... 700/245

FOREIGN PATENT DOCUMENTS

| JP | 05-071255 | 3/1993 |
|---|---|---|
| JP | 07-197711 | 8/1995 |
| JP | 2002-216129 | 8/2002 |
| JP | 2003-039365 | 2/2003 |
| JP | 2003-326483 | 11/2003 |
| JP | 2004-094288 | 3/2004 |

* cited by examiner

*Primary Examiner*—Donnie L. Crosland
(74) *Attorney, Agent, or Firm*—Squire, Sanders & Dempsey L.L.P.

(57) ABSTRACT

A customer robot enabling a customer service including key management with respect to a plurality of lock-equipped objects in an environment such as vehicles in a parking lot is provided. The robot has an unlock/lock signal database storing unlock/lock signals respectively set for the objects, an object identification implementor recognizing an instruction of a customer and identifying one from among the objects which the customer wants unlocked/locked, an unlock/lock signal retriever retrieving one from among the unlock/lock signals, stored in the unlock/lock signal database, that is corresponding to the one from among the objects which the customer wants unlocked/locked, and an unlock/lock signal transmitter transmitting the retrieved signal to unlock/lock the identified object, thereby reducing the burden of the person responsible for key management.

8 Claims, 10 Drawing Sheets

| VEHICLE (NAME, ATTRIBUTES, ETC.) | IC TAG TRANSMIT SIGNALS | UNLOCK SIGNALS |
|---|---|---|
| ACCORD (RED, SEDAN) | IC1 | KEY 1 |
| CIVIC (WHITE, SEDAN) | IC2 | KEY 2 |
| ODYSSEY (BLACK, MINIVAN) | IC3 | KEY 3 |
| ⋮ | ⋮ | ⋮ |

| VEHICLE<br>(NAME, ATTRIBUTES, ETC.) | PARKING SPOTS | IC TAG TRANSMIT SIGNALS | UNLOCK SIGNALS |
|---|---|---|---|
| ACCORD (RED, SEDAN) | ROW 1 COLUMN 1 | IC1 | KEY 1 |
| CIVIC (WHITE, SEDAN) | ROW 1 COLUMN 2 | IC2 | KEY 2 |
| ODYSSEY (BLACK, MINIVAN) | ROW 1 COLUMN 3 | IC3 | KEY 3 |
| ⋮ | ⋮ | ⋮ | ⋮ |

CUSTOMER SERVICE ROBOT

BACKGROUND OF THE INVENTION

1. Field of the Invention

This invention relates to a customer service robot, particularly to a mobile robot configured to be capable of ready key management with respect to numerous lock-equipped objects, 2. Description of the Related Art At auto dealers, safe deposit box facilities, mutlti-family dwellings and the like, the person responsible for safekeeping of the many different keys for the vehicles, safe deposit boxes, apartments etc. (a salesperson, for example) is required to respond to a customer request or instruction by taking out the key concerned and unlocking or locking the associated lock. This is troublesome work.

Techniques for making this work easier have therefore been sought. Japanese Laid-Open Patent Application No. Hei 5(1993)-071255, for example, teaches a key safekeeping system in which the cover of a key storage box provided in a safekeeping case is key-locked with a symbolic key and a device for inputting and storing the symbol of the user is built into the safekeeping case and fastened to the door.

On the other hand, as taught by Japanese Laid-Open Patent Application No. Hei 7(1995)-197711, it is common in the case of vehicles to use keyless entry devices that lock and unlock a door by transmitting a signal (Radio Frequency signal) instead of using a key.

Also, as taught by Japanese Laid-Open Patent Application No. 2003-326483, for instance, various mobile robots have been developed that are capable of carrying out tasks in a human living environment.

However, the first prior art '255 uses physical keys and therefore still involves troublesome safekeeping of many keys. Although the second prior art '711 avoids the trouble of managing physical keys, the trouble of having to manage a large number of keys remains unsolved because every vehicle or other object to be locked and unlocked requires a different signal.

Further, the above will not be limited only to the work of unlocking or locking, a sales person at the auto dealers and the like is sometimes required to respond to customer request or instruction, to identify one among objects interested by the customer, and to guide the customer there. This is also troublesome work.

SUMMARY OF THE INVENTION

An object of this invention is therefore to overcome the foregoing inconvenience by using the aforesaid keyless entry device instead of physical keys and applying mobile robot technologies to provide a customer service robot enabling ready key management with respect to numerous lock-equipped objects, thereby reducing the burden of the person responsible for key management.

Another object of this invention is therefore to overcome the foregoing inconvenience by applying mobile robot technologies to provide a customer service robot enabling to respond to customer request or instruction, to identify one among objects interested by the customer, and to guide the customer there, thereby reducing the burden of the person responsible therefore.

In order to achieve the first object, this invention provides in a first aspect a customer service robot moving around a surrounding environment and enabling a customer service including key management with respect to a plurality of lock-equipped objects in the environment, comprising: an unlock/lock signal database storing unlock/lock signals respectively set for the objects; an object identification implementor recognizing an instruction of a customer and identifying one from among the objects which the customer wants unlocked/locked; an unlock/lock signal retriever retrieving one from among the unlock/lock signals, stored in the unlock/lock signal database, that is corresponding to the one from among the objects which the customer wants unlocked/locked; and an unlock/lock signal transmitter transmitting the retrieved signal to unlock/lock the identified object.

In order to achieve the second object, this invention provides in a second aspect a customer service robot moving around a surrounding environment and enabling a customer service with respect to a plurality of objects in the environment, comprising: an IC tag signal database storing IC tag signals transmitted by IC tags placed in the objects; an IC tag signal retriever recognizing an instruction of a customer and retrieving one from among the IC tag signals, stored in the IC tag signal database, that is estimated to be one from among the objects interested by a customer, from the recognized instruction of the customer; an IC tag identification implementor identifying one from among the IC tags that transmits a signal corresponding to the retrieved IC tag signal; and an object identification implementor identifying the one from among the objects interested by the customer from the identified IC tag and guiding the customer to the identified object.

BRIEF DESCRIPTION OF THE DRAWINGS

The above and other objects and advantages of the invention will be more apparent from the following description and drawings in which:

FIG. 10 is a diagram for explaining data stored in the keyless database shown in FIG. 5, including a set of unlock signals each associated with a specific vehicle, a set of IC tag transmit signals each associated with an IC tag placed in a specific vehicle, and the like;

DETAILED DESCRIPTION OF THE PREFERRED EMBODIMENT

A preferred embodiment of a customer service robot according to the invention will now be explained with reference to the attached drawings.

Figure 1:
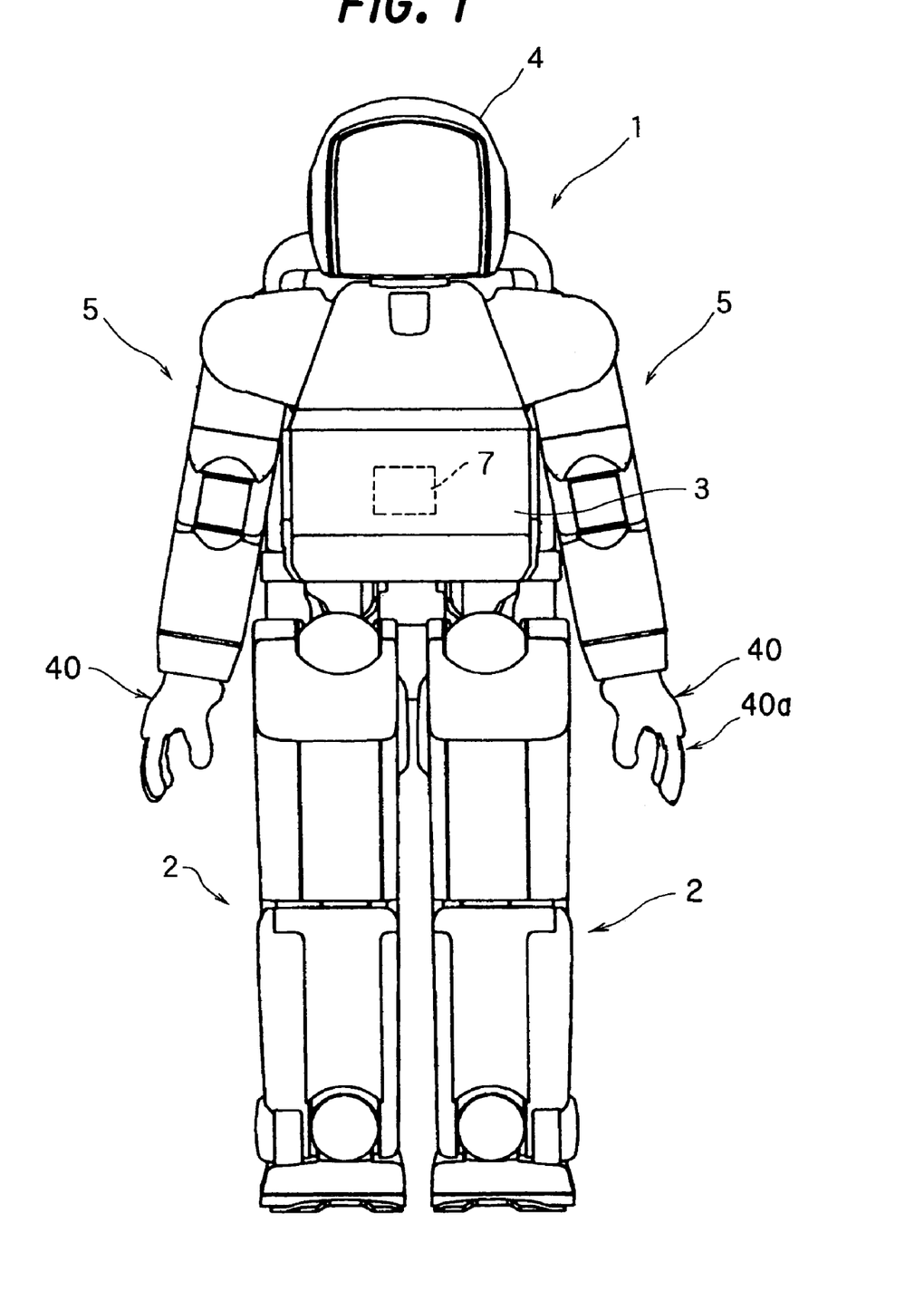
FIG. 1 is a front view of a customer service robot according to an embodiment of the invention.
Figure 2:
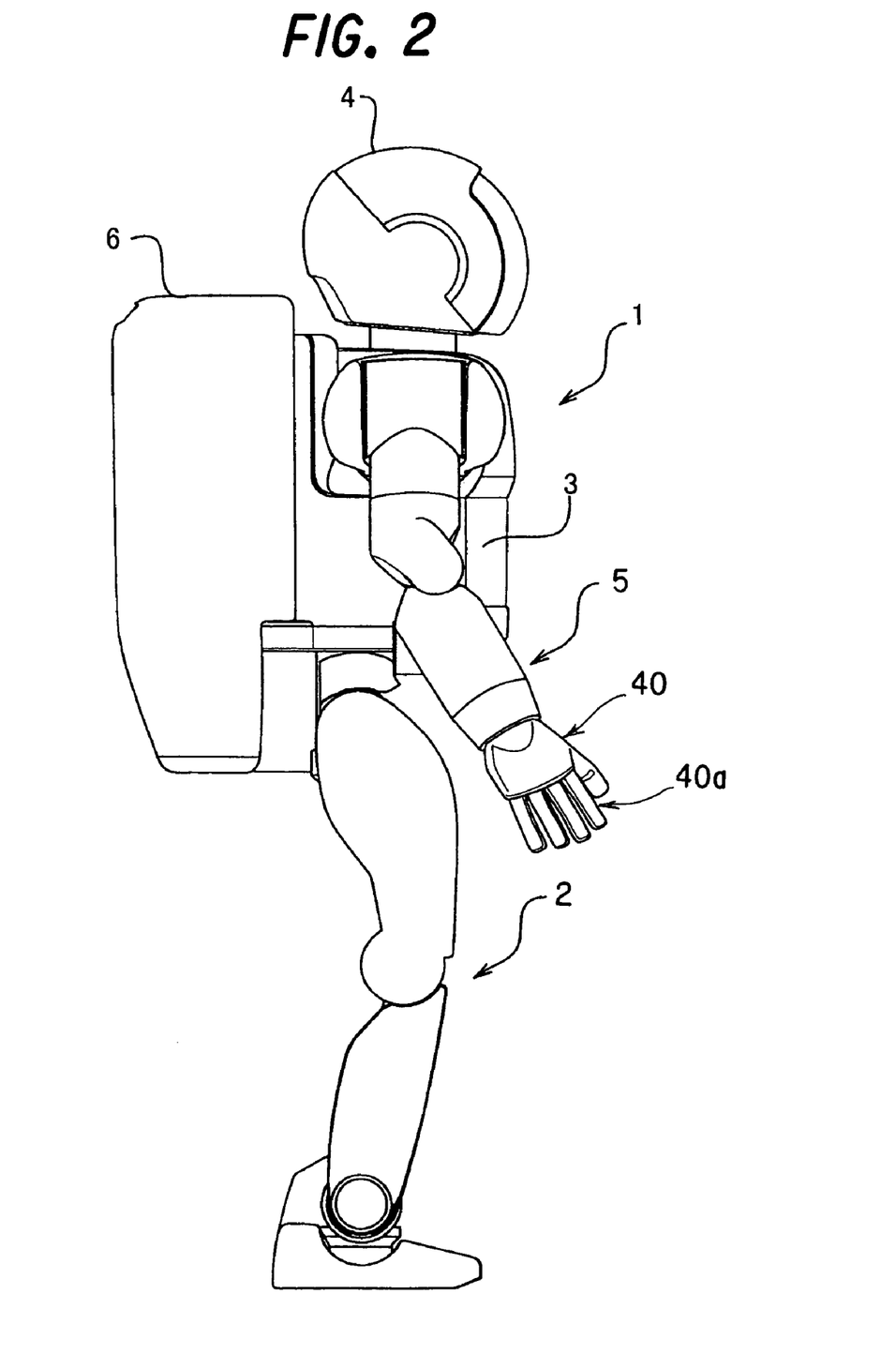
FIG. 2 is side view of the customer service robot shown in FIG. 1.

FIG. 1 is a front view of a customer service robot according to an embodiment of the invention and FIG. 2 is a side view thereof. A humanoid legged mobile robot (mobile robot modeled after the form of the human body) provided with two legs and two arms and capable of bipedal locomotion, is taken as an example of customer service robots.

As shown in FIG. 1, the customer service robot (now assigned with reference numeral 1 and hereinafter referred to as "robot") is equipped with a plurality of, specifically a pair of leg linkages (legs) 2 and a body (upper body) 3 above the leg linkages 2. A head 4 is formed on the upper end of the body 3 and two arm linkages 5 are connected to opposite sides of the body 3. As shown in FIG. 2, a housing unit 6 is mounted on the back of the body 3 for accommodating an electronic control unit (explained later), a battery and the like.

The robot 1 shown in FIGS. 1 and 2 is equipped with covers for protecting its internal structures. A keyless entry device 7 (not shown in FIG. 2) is provided inside the robot 1.

Figure 3:
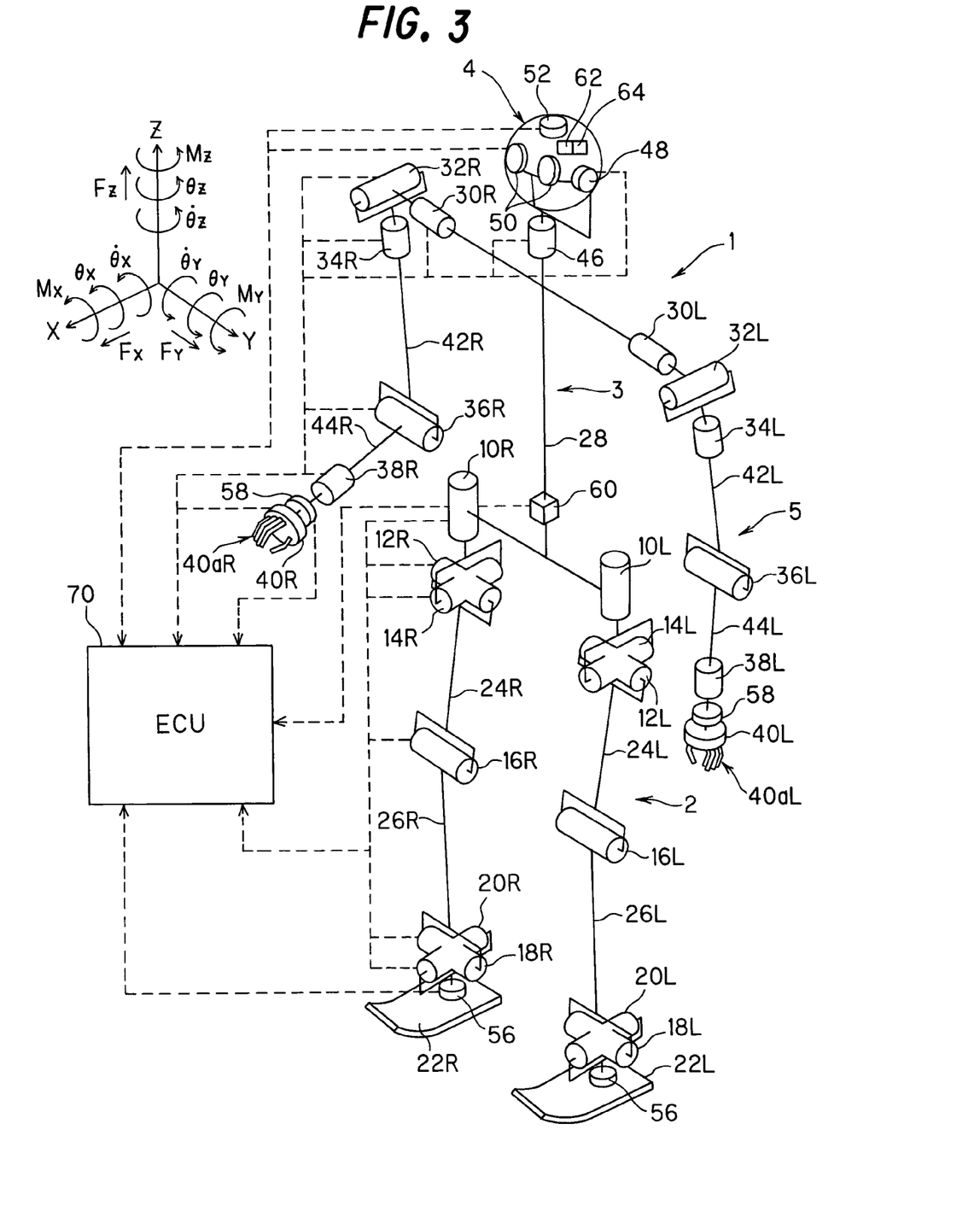
FIG. 3 is an explanatory view showing a skeletonized view of the robot shown in FIG. 1.

FIG. 3 is an explanatory diagram showing a skeletonized view of the robot 1. The internal structures of the robot 1 will be explained with reference to this drawing, with primary focus on the joints. As illustrated, the leg linkages 2 and arm linkages 5 on either the left or right of the robot 1 are equipped with six joints driven by 11 electric motors.

Specifically, the robot 1 is equipped at its hips (crotch) with electric motors 10R, 10L (R and L indicating the right and left sides; hereinafter the indications R and L will be omitted as is apparent for its symmetric structure) constituting joints for swinging or swiveling the leg linkages 2 around a vertical axis (the Z axis or vertical axis), electric motors 12 constituting joints for driving (swinging) the leg linkages 2 in the pitch (advance) direction (around the Y axis), and electric motors 14 constituting joints for driving the leg linkages 2 in the roll (lateral) direction (around the X axis), is equipped at its knees with electric motors 16 constituting knee joints for driving the lower portions of the leg linkages 2 in the pitch direction (around the Y axis), and is equipped at its ankles with electric motors 18 constituting foot (ankle) joints for driving the distal ends of the leg linkages 2 in the pitch direction (around the Y axis) and electric motors 20 constituting foot (ankle) joints for driving them in the roll direction (around the X axis).

As set out in the foregoing, the joints are indicated in FIG. 3 by the axes of rotation of the electric motors driving the joints (or the axes of rotation of transmitting elements (pulleys, etc.) connected to the electric motors for transmitting the power thereof). Feet 22 are attached to the distal ends of the leg linkages 2.

In this manner, the electric motors 10, 12 and 14 are disposed at the crotch or hip joints of the leg linkages 2 with their axes of rotation oriented orthogonally, and the electric motors 18 and 20 are disposed at the foot joints (ankle joints) with their axes of rotation oriented orthogonally. The crotch joints and knee joints are connected by thigh links 24 and the knee joints and foot joints are connected by shank links 26.

The leg linkages 2 are connected through the crotch joints to the body 3, which is represented in FIG. 3 simply by a body link 28. The arm linkages 5 are connected to the body 3, as set out above.

The arm linkages 5 are configured similarly to the leg linkages 2. Specifically, the robot 1 is equipped at its shoulders with electric motors 30 constituting joints for driving the arm linkages 5 in the pitch direction and electric motors 32 constituting joints for driving them in the roll direction, is equipped with electric motors 34 constituting joints for swiveling the free ends of the arm linkages 5, is equipped at its elbows with electric motors 36 constituting joints for swiveling parts distal thereof, and is equipped at the distal ends of the arm linkages 5 with electric motors 38 constituting wrist joints for swiveling the distal ends. Hands (end effectors) 40 are attached to the distal ends of the wrists.

In other words, the electric motors 30, 32 and 34 are disposed at the shoulder joints of the arm linkages 5 with their axes of rotation oriented orthogonally. The shoulder joints and elbow joints are connected by upper arm links 42 and the elbow joints and wrist joints are connected by forearm links 44.

Although not shown in the figure, the hands 40 are equipped with a driving mechanism comprising five fingers 40a. The fingers 40a are configured to be able to carry out a task, such as grasping an object.

Figure 4:
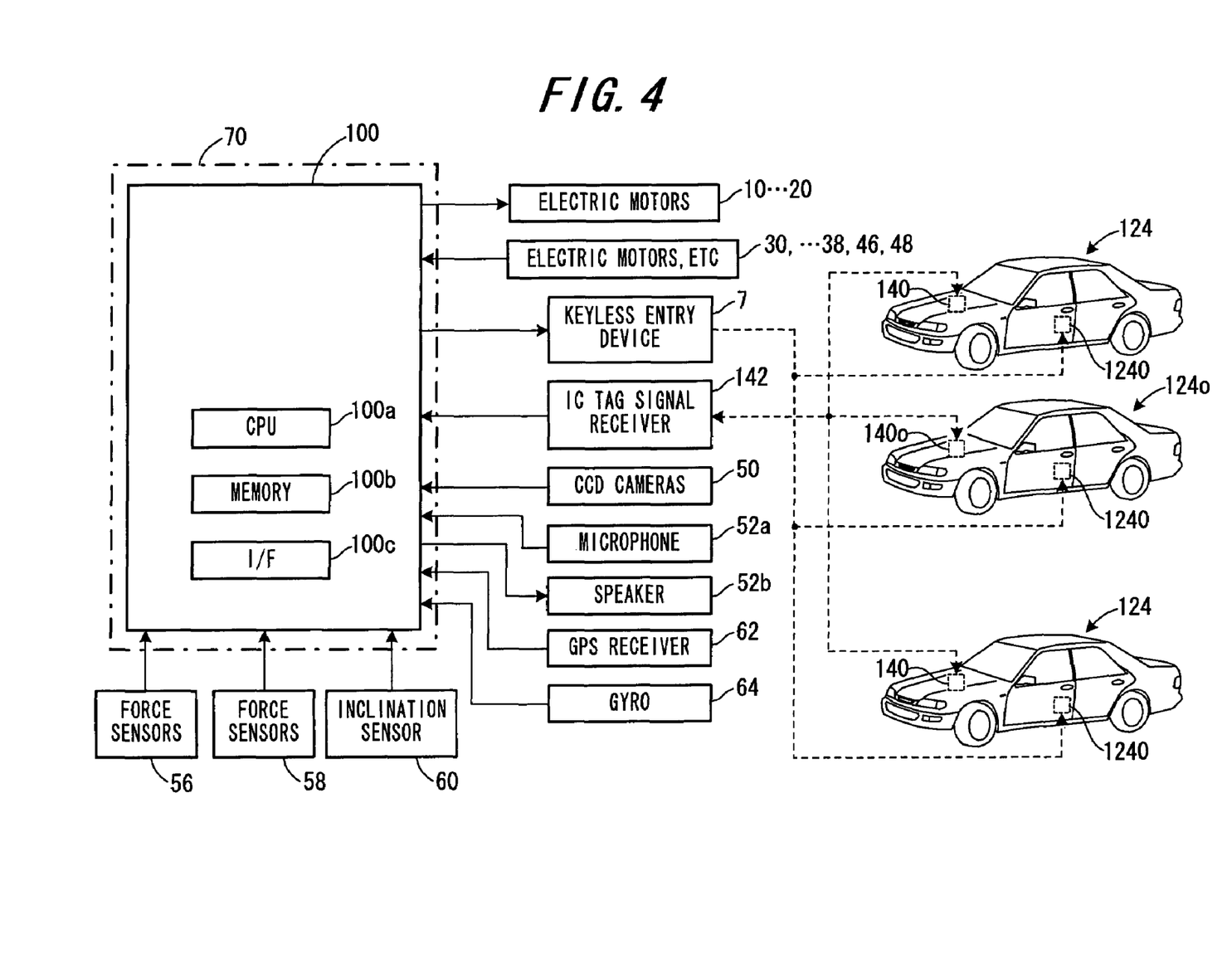
FIG. 4 is a block diagram showing the configuration of an electronic control unit (ECU) shown in FIG. 3.

The head 4 is connected to the body 3 through an electric motor (comprising a neck joint) 46 around a vertical axis and a head nod mechanism 48 for rotating the head 4 around an axis perpendicular thereto. As shown in FIG. 3, the interior of the head 4 has mounted therein two CCD cameras 50 that can produce stereoscopic images, and a voice input/output device 52. The voice input/output device 52 comprises a microphone 52a and a speaker 52b, as shown in FIG. 4 later.

Owing to the foregoing configuration, the leg linkages 2 are each provided with 6 joints constituted of a total of 12 degrees of freedom for the left and right legs, so that during locomotion the legs as a whole can be imparted with desired movements by driving (displacing) the six joints to appropriate angles to enable desired walking in three-dimensional space. Further, the arm linkages 5 are each provided with 5 joints constituted of a total of 10 degrees of freedom for the left and right arms, so that desired tasks can be carried out by driving (displacing) these 5 joints to appropriate angles. In addition, the head 4 is provided with a joint and the head nod mechanism constituted of 2 degrees of freedom, so that the head 4 can be faced in a desired direction by driving these to appropriate angles.

Each of the electric motors 10 and the like is provided with a rotary encoder (not shown) that generates a signal corresponding to at least one among the angle, angular velocity and angular acceleration of the associated joint produced by the rotation of the rotary shaft of the electric motor.

A conventional six-axis force sensor (hereinafter referred to as "force sensor") 56 is attached to each foot member 22, generates signals representing, of the external forces acting on the robot, the floor reaction force components Fx, Fy and Fz of three directions and the moment components Mx, My and Mz of three directions acting on the robot from the surface of contact.

Similar force sensors (six-axis force sensor) 58 are also attached between the wrist joints and the hands 40 for outputting signals representing force components Fx, Fy and Fz of three directions and moment components Mx, My and Mz of three directions of external forces other than floor reaction forces acting on the robot 1, specifically external forces acting on the hands 40 from objects (object reaction forces).

In addition, an inclination sensor 60 installed on the body 3 generates a signal representing at least one of the inclination (tilt angle) relative to the vertical axis and the angular velocity thereof, i.e., representing at least one quantity of state such as the inclination (posture) of the body 3 of the robot 1.

The interior of the head 4 is equipped with a GPS receiver 62 that receives a signal from GPS (Global Positioning System), and a gyro 64, in addition to the CCD cameras 50 and voice input/output device 52.

The outputs of the force sensors 56 etc. are inputted to an electronic control unit (hereinafter referred to as "ECU") 70 that comprises a microcomputer and is provided in the housing unit 6 (in the figure, the input/output is shown only for the right side of the robot 1 for ease of illustration).

FIG. 4 is a block diagram showing the configuration of the ECU 70.

The ECU 70 comprises a microcomputer 100 equipped with a CPU 100a, memory unit 100b and input-output interface 100c. The ECU 70 calculates joint angular displacement commands that is used to control the electric motor 10 and other motors constituting the joints so as to enable the robot 1 to keep a stable posture while moving. As explained below, it also implements or performs various processing operations, including ones for vehicle identification. These will be explained later.

Figure 5:
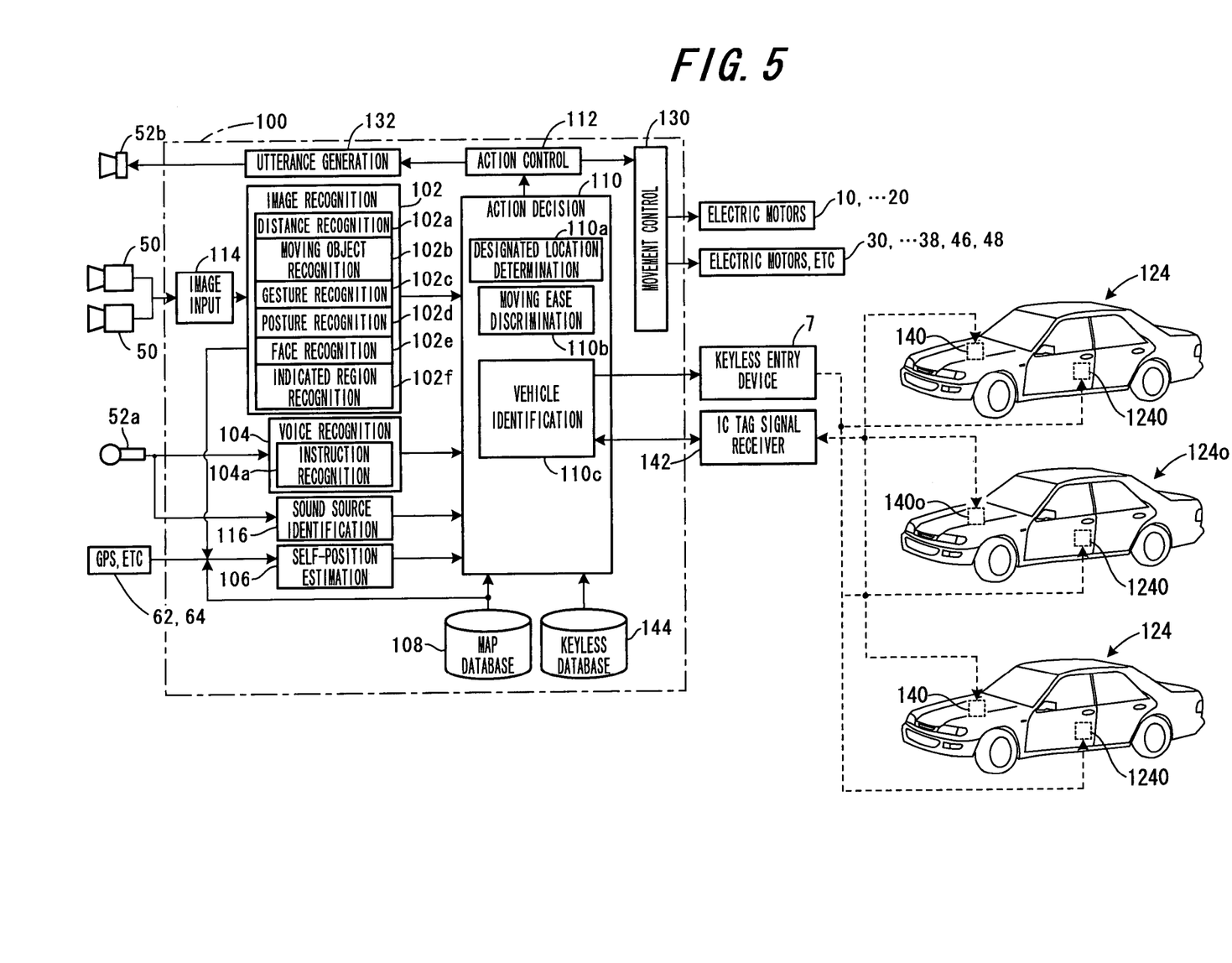
FIG. 5 is block diagram functionally illustrating the operation of a microcomputer of the electronic control unit shown in FIG. 4.

FIG. 5 is block diagram showing the processing operations of the CPU 100a in the microcomputer 100 of the ECU 70. It should be noted that many of the sensors, etc., are not shown in FIG. 5.

As can be seen from FIG. 5, the CPU 100a is equipped with, inter alia, an image recognition unit 102, voice recognition unit 104, self-position estimation unit 106, map database 108, action decision unit 110 for deciding actions of the robot 1 based on the outputs of the foregoing units, and action control unit 112 for controlling actions of the robot 1 based on the actions decided by the action decision unit 110. In FIG. 5, for ease of illustration, the term "unit" is omitted.

These units will be explained individually.

The image recognition unit 102 comprises a distance recognition unit 102a, moving object recognition unit 102b, gesture recognition unit 102c, posture recognition unit 102d, face region recognition unit 102e, and indicated region recognition unit 102f. Stereoscopic images of the surroundings taken and produced by two CCD cameras 50 are inputted to the distance recognition unit 102a through an image input unit 114.

The distance recognition unit 102a calculates data representing distances to imaged objects from the parallax of the received stereoscopic images and creates distance images. The moving object recognition unit 102b receives the distance images and calculates differences between images of multiple frames to recognize (detect) moving objects such as customers, vehicles and the like.

The gesture recognition unit 102c utilizes techniques taught in Japanese Laid-Open Patent Application No. 2003-077673 (proposed by the assignee) to recognize hand movements of customers and the like and compares them with characteristic hand movements stored in memory beforehand to recognize gestured instructions accompanying utterances of customers and the like.

The posture recognition unit 102d uses techniques taught in Japanese Laid-Open Patent Application No. 2003-039365 (proposed by the assignee) to recognize the posture of customers and the like. The face region recognition unit 102e uses techniques taught in Japanese Laid-Open Patent Application No. 2002-216129 (proposed by the assignee) to recognize the face regions of customers and the like. The indicated region recognition unit 102f uses techniques taught in Japanese Laid-Open Patent Application No. 2003-094288 (proposed by the assignee) to recognize directions indicated by the hands and the like of customers and the like.

The voice recognition unit 104 is equipped with an instruction recognition unit 104a. The instruction recognition unit 104a receives the voices of customers and the like inputted through the microphone 52a of the voice input-output unit 52 and uses vocabulary stored in the memory unit 100b beforehand to recognize instructions of customers and the like and zooms a region designated by the instructions. The voice inputted from the microphone 52a is sent to a sound source identification unit 116 that identifies or determines the position of the sound source and discriminates between voice and non-voice impact noise.

The self-position estimation unit 106 receives GPS signals or the like through the GPS receiver 62 and uses them to estimate (detect) the current position of the robot 1 and the direction in which it is facing.

The map database 108 resides in the memory unit 100b and stores map information compiled in advance by recording features of the surrounding vicinity and the locations of obstacles within a region.

Figure 6:
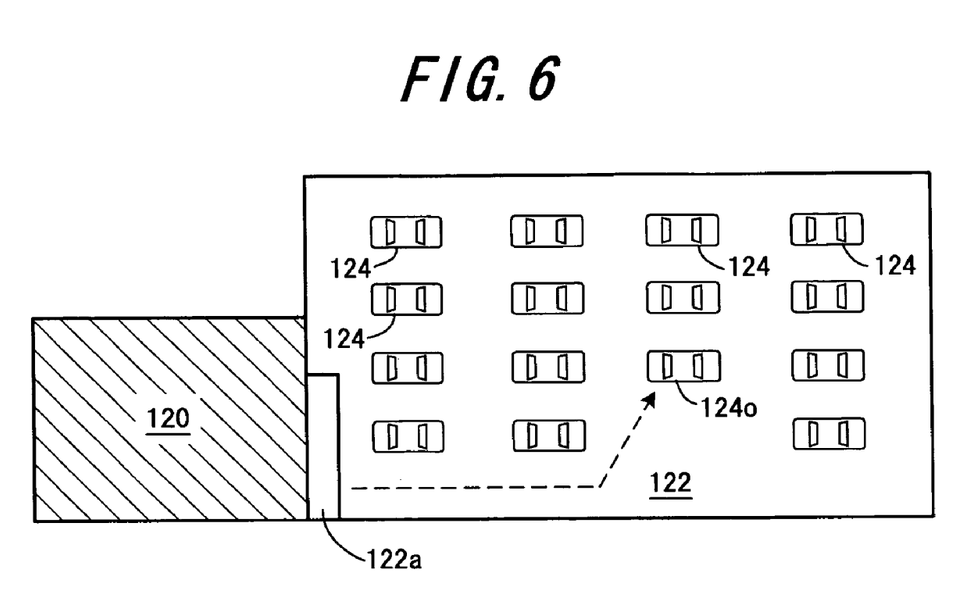
FIG. 6 is an explanatory diagram showing surrounding vicinity map information stored in a map database shown in FIG. 5.

FIG. 6 is an explanatory diagram showing the surrounding vicinity, specifically an auto dealer's showroom 120 and neighboring parking lot 122. In this embodiment, the robot 1 is programmed to unlock or lock doors of a plurality of vehicles 124 on display in the parking lot 122, as illustrated, in response to a customer request. The map database 108 stores (contains) map information compiled to include obstacles in the auto dealer's showroom 120 and parking lot 122, e.g., a step 122a in the parking lot 122.

The explanation of FIG. 5 will be continued.

The action decision unit 110 is equipped with a designated location determination unit 110a, moving ease discrimination unit 110b, and vehicle identification unit 110c.

Based on the region the image recognition unit 102 recognized as that designated by the customer or the like and the designated region zoomed in by the voice recognition unit 104, the designated location determination unit 110a determines, as a desired movement destination value, the location designated by the customer or the like, more specifically the location of the particular vehicle 124o or the like among the vehicles 124 with respect to which the customer wants door unlocking or locking.

The moving ease discrimination unit 110b recognizes the locations of obstacles present in the map information read from the map database 108 for the region around the current location of the robot 1, defines the areas near the obstacles as hazardous zones, defines zones up to a certain distance away from the defined hazardous zones as potentially hazardous zones and judges the moving ease in these zones as "difficult," "requiring caution" or similar.

The action decision unit 110 uses the recognition results of the image recognition unit 102 and voice recognition unit 104 to discriminate whether it is necessary to move to the designated location determined by the designated location determination unit 110a. Further, when the moving ease discrimination unit 110b makes a "difficult" determination, for example, based on the discriminated moving ease, the action decision unit 110 decides to lower the walking speed or the like and decides the next action of the robot 1 in response to information received from the image recognition unit 102, voice recognition unit 104 and the like. For example, when sound source position information is outputted by the sound source determination unit 116, the action decision unit 110 decides to reorient the robot 1 to face toward the sound source.

Explanation will be made later regarding the vehicle identification unit 110c.

The action decisions of the action decision unit 110 are sent to the action control unit 112. The action control unit 112 responds to the action decisions by outputting action instructions to a movement control unit 130 or an utterance generation unit 132.

The movement control unit 130 is responsive to instructions from the action control unit 112 for outputting drive signals to the electric motor 10 and other motors of the legs 2, head 4 and arms 5, thereby causing the robot 1 to move (act).

In accordance with instructions from the action control unit 112, the utterance generation unit 132 uses character string data for utterances to be made stored in the memory unit 100b to generate synthesized voice signals for the utterances and uses them to drive the speaker 52b of the voice input-output unit 52. The utterance generation unit 132 and speaker 52b of the voice input-output unit 52 constitute an utterance unit.

The vehicle identification unit 110c will now be explained.

The vehicle identification unit 110c identifies or determines the vehicle 124o with regard to which the customer wants door unlocking or locking.

Explaining this, one of the IC tags, designated by reference numeral 140, is placed at an appropriate location on or near the dashboard of each vehicle (subject) 124 parked in the parking lot 122 and, as shown in FIG. 4, the ECU 70 is equipped with an IC tag signal receiver (reader) 142 for receiving the IC tag signals transmitted (sent) by the IC tags 140.

More specifically, the combination of the IC tag 140 and IC tag signal receiver (reader) 142 enables the ECU 70 to exhibit RFID (Radio Frequency Identification) capability. As shown in FIG. 5, the vehicle identification unit 110c uses the signals received via the IC tag signal receiver 142 to identify the vehicle 124o that the customer wants its door to be unlocked or locked.

Figure 7:
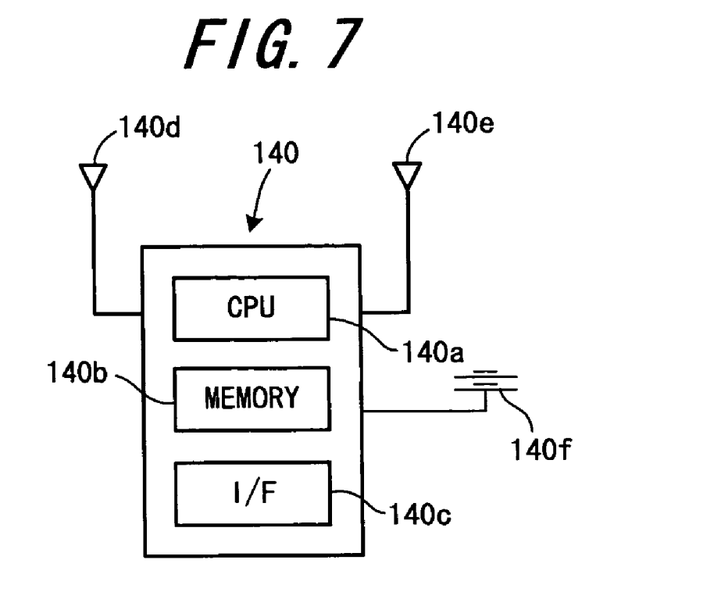
FIG. 7 is a block diagram showing the configuration of an IC tag placed in each of the vehicles shown in FIG. 6.

As shown in the block diagram of FIG. 7, the IC tag 140 is equipped with a CPU 140a, memory unit 140b, input-output interface (I/F) 140c, receiving antenna 140d, and transmitting antenna 140e, and is configured as an active IC tag having a built-in power source 140f.

Figure 8:
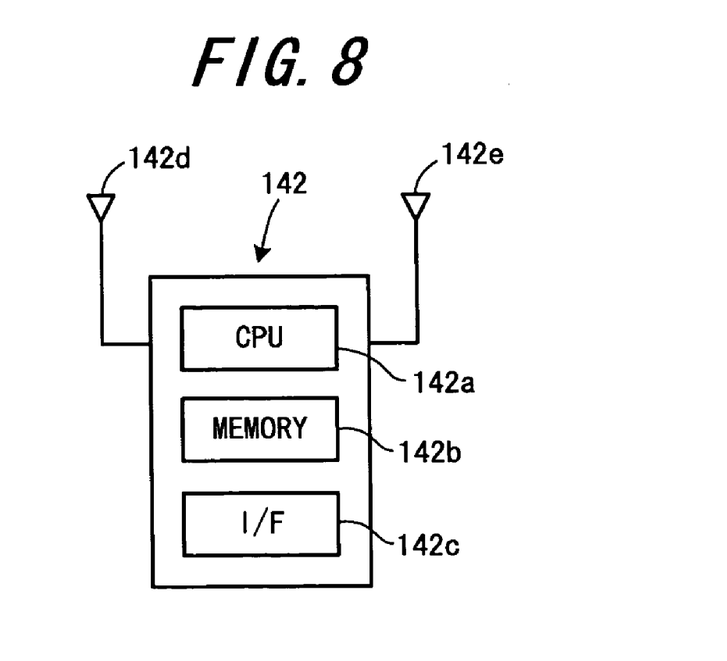
FIG. 8 is a block diagram showing the configuration of an IC tag signal receiver (reader) shown in FIGS. 4 and 5.

As shown in the block diagram of FIG. 8, the IC tag signal receiver 142 is equipped with a CPU 142a, memory unit 142b, input-output interface (I/F) 142c, receiving antenna 142d, and transmitting antenna 142e.

The IC tag signal receiver 142 transmits a wakeup signal from its transmitting antenna 142e. The IC tag 140 receives the wakeup signal through its receiving antenna 140d and responds thereto by transmitting a signal (frequency signal) from its transmitting antenna 140e. The frequency of the transmitted signal is specific to the particular IC tag 140 and thus to the particularly vehicle 124 in which it is placed. The IC tag signal receiver 142 receives the signal transmitted from the IC tag 140 through its receiving antenna 142d.

As shown in FIG. 5, a keyless entry device 7 incorporated in the body 3 of the robot 1 is connected to the ECU 70.

Figure 9:
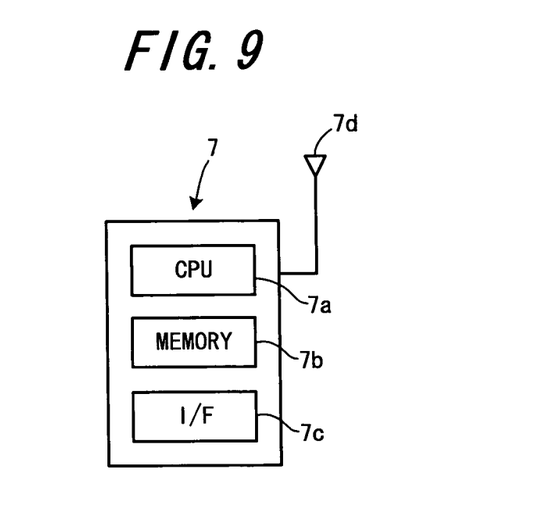
FIG. 9 is a block diagram showing the configuration of a keyless entry device shown in FIGS. 4 and 5.

As shown in the block diagram of FIG. 9, the keyless entry device 7 is equipped with a CPU 7a, memory unit 7b, input-output interface (I/F) 7c, and transmitting antenna 7d. When driven by the ECU 70, the keyless entry device 7 transmits an unlock signal (or lock signal) from the transmitting antenna 7d. The microcomputer 100, keyless entry device 7, IC tag signal receiver 142 and the like are powered by a battery accommodated in the housing unit 6.

As shown in FIG. 5, the microcomputer 100 of the ECU 70 is equipped with a keyless database 144 in addition to the map database 108. The keyless database 144 stores a set of transmit signals to be transmitted by the IC tags 140 placed in the respective vehicles 124 and a set of unlock (and lock) signals defined for the respective vehicles 124.

The unlock signals are electromagnetic signals separately defined for the individual vehicles 124. When driven by the ECU 70, the keyless entry device 7 transmits an unlock signal from its transmitting antenna 7d to operate an electric motor or other such actuator 1240 installed in a door-lock mechanism (not shown) of the corresponding vehicle 124, thereby unlocking the door.

Transmission of the unlock signal when the door is locked unlocks the door and transmission of the lock signal when the door is unlocked locks the door, so that the unlock signal and lock signal can be the same signal. In the following description, therefore, the term "unlock signal" is sometimes used for the unlock signal and the lock signal taken together.

Figure 10:
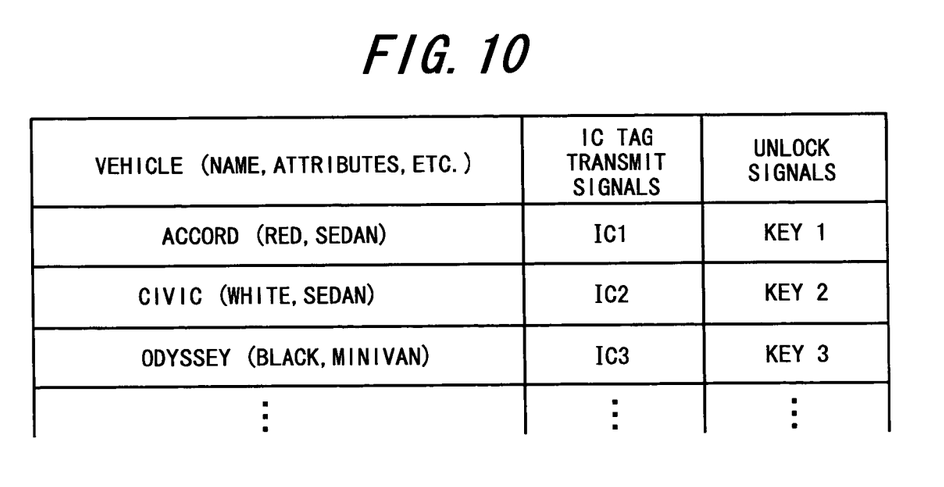

The signal sets stored in memory will be explained with reference to FIG. 10. The set of unlock signals (designated in the drawing as "key n," where n represents 1, 2, 3, ... ) defined for the individual vehicles 124 are stored in memory in association with the aforesaid set of IC tag 140 transmit signals ("IC n" in the figure) defined for the individual IC tags 140. The name, attributes (color, model etc.) and the like of the corresponding vehicles 124 are also stored in association therewith.

In other words, in light of the fact that customers designate vehicles using names and attributes like body color, in the manner of "that red Accord" or "the white Civic over there," the set of unlock signals and the like are stored in association with the names and attributes likely to be used to identify the vehicles 124. Although the body colors are assigned formal designations like "Milan Red," customers usually refer to colors using everyday words so it is these that are stored in memory.

Figure 11:
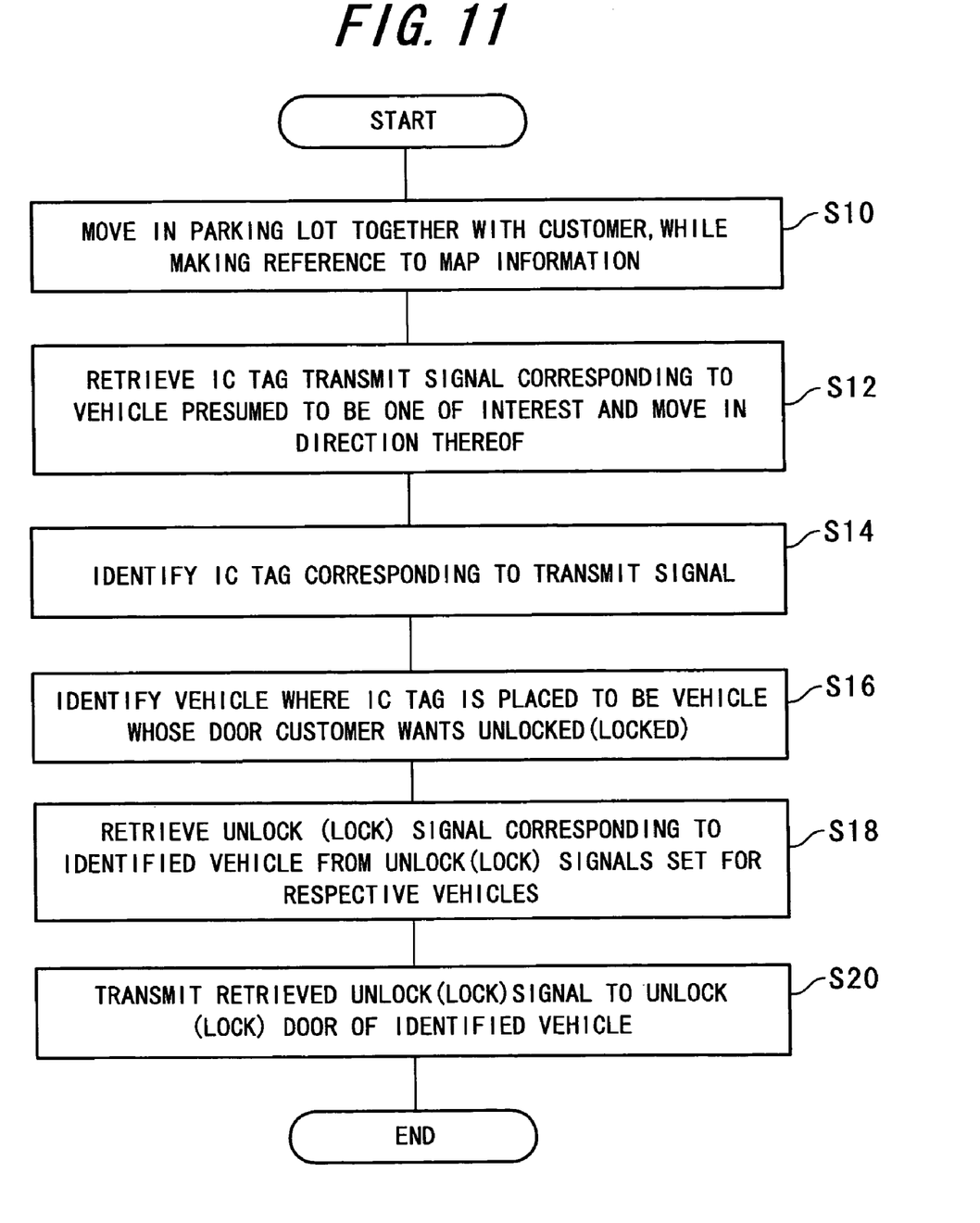
FIG. 11 is a flowchart showing the sequence of operations of the customer service robot shown in FIG. 1.

The sequence of operations of the robot 1 shown in FIG. 1 will now be explained with reference to the flowchart of FIG. 11. Exactly speaking, these are operations executed by the CPU 100a of the microcomputer 100 of the ECU 70.

First, in S10, the action control unit 112 operates the movement control unit 130 in accordance with the action decided by the action decision unit 110 while making reference to the map information stored in the map database 108, thereby moving the robot 1 through the parking lot in the direction of (or together with) the customer.

Next, in S12, the instructions of the customer are recognized through the voice recognition unit 104 and the transmit signal of the IC tag 140o corresponding to the vehicle 124o presumed (determined) from the recognized instructions to be the one whose door the customer wants unlocked (locked) is retrieved from the stored set of transmit signals transmitted by the IC tags 140 placed in the vehicles 124 parked in the parking lot 122, and the robot 1 moves in the direction thereof.

As explained earlier, this is achieved by recognizing attributes of the vehicle 124 from an utterance (voice) of the customer such as "that red Accord" or by deducing the vehicle 124o of interest through recognition of customer gestures such as finger-pointing, and then retrieving the corresponding transmit signal (ICn) from the keyless database 144 whose characteristics are shown in FIG. 9. At the same time, the location of the vehicle 124*o* is recognized by image recognition, and the movement control unit 130 is operated through the action control unit 112 to make the robot 1 move toward the vehicle 124*o* while guiding the customer.

Next, in S14, the IC tag 140*o* that transmits the transmit signal corresponding to the transmit signal retrieved from among the IC tags 140 placed in the vehicles 124 is identified or determined. As shown by the broken line in FIG. 6, this is achieved by moving toward the vehicle 124*o* presumed to be the one of interest together with the customer, then, upon coming near the vehicle 124*o* transmitting a wakeup signal in the direction of the IC tag 140*o* placed therein, receiving the transmit signal transmitted in response, and checking whether it coincides with the retrieved transmit signal.

Next, in S116, the vehicle 124 in which the determined IC tag 140*o* is placed is identified or determined to be the vehicle 124*o* whose door the customer wants unlocked (locked).

Next, in S18, the unlock signal (key-n) corresponding to the identified vehicle is retrieved from the set of unlock (lock) signals for the respective vehicles 124 stored in memory. This is achieved by retrieving from the keyless database 144 the unlock signal (key-n) corresponding to the transmit signal (ICn) of the identified IC tag 140*o*.

Next, in S20, the action control unit 112 operates the movement control unit 130 to make the keyless entry device 7 transmit the retrieved unlock (lock) signal, thereby unlocking the door of the identified vehicle 124*o*. As explained earlier, the door can be relocked later by transmitting the same signal.

On the other hand, if what the customer instructed or requested was to be shown to the identified vehicle 124*o*, it suffices to guide the customer to that location.

This embodiment is thus configured to have a customer service robot (1) moving around a surrounding environment and enabling a customer service including key management with respect to a plurality of lock-equipped objects (e.g., vehicles 124) in the environment, comprising: an unlock/lock signal database (keyless database 144) storing unlock/lock (unlock or lock) signals (key n) respectively set for the objects; an object identification implementor (CPU 100*a*, vehicle identification unit 110*c*, Si0 to S16) recognizing an instruction of a customer and identifying one (vehicle 124*o*) from among the objects which the customer wants unlocked/locked; an unlock/lock signal retriever (CPU 100*a*, vehicle identification unit 110*c*, S18) retrieving one from among the unlock/lock signals, stored in the unlock/lock signal database, that is corresponding to the one from among the objects (vehicles 124) which the customer wants unlocked/locked; and an unlock/lock signal transmitter (keyless entry device 7, CPU 100*a*, action control unit 112, S20) transmitting the retrieved signal to unlock/lock (unlock or lock) the identified object.

In the robot, the object identification implementor includes: a voice recognition unit (CPU 100*a*, voice recognition unit 104) recognizing a voice instruction of the customer; and recognizes the instruction of the customer and identifies the one (vehicle 124*o*) from among the objects (vehicles 124) which the customer wants unlocked/locked.

In the robot, the object identification implementor includes: an IC tag signal database (keyless database 144) storing IC tag signals (ICn) transmitted by IC tags (140) placed in the objects; an IC tag signal retriever (CPU 100*a*, vehicle identification unit 110*c*, S12) retrieving one from among the IC tag signals, stored in the IC tag signal database, that is estimated to be corresponding to the one from among the objects (vehicles 124) which the customer wants unlocked/locked from the recognized voice instruction of the customer; and an IC tag identification implementor (CPU 110*c*, vehicle identification unit 110*c*, S14) identifying one (140*o*) from among the IC tags that transmits a signal corresponding to the retrieved IC tag signal; and identifies the one from among the objects which the customer wants unlocked/locked from the identified IC tag (S116).

The robot further includes: a map database (108) storing information on a map of the environment; and the object identification implementor moves in the environment to identify the one from among the objects which the customer wants unlocked/locked in accordance with the stored map information.

This embodiment is further configured to have a customer service robot (1) moving around a surrounding environment and enabling a customer service with respect to a plurality of objects (vehicles 124) in the environment, comprising: an IC tag signal database (keyless database 144) storing IC tag signals (ICn) transmitted by IC tags (140) placed in the objects; an IC tag signal retriever (CPU 100*a*, vehicle identification unit 110*c*, S112) recognizing an instruction of a customer and retrieving one (vehicle 124*o*) from among the IC tag signals, stored in the IC tag signal database, that is estimated to be one from among the objects interested by a customer, from the recognized instruction of the customer; an IC tag identification implementor (CPU 100*a*, vehicle identification unit 110*c*, S14) identifying one (140*o*) from among the IC tags (140) that transmits a signal corresponding to the retrieved IC tag signal; and an object identification implementor (CPU 100*a*, vehicle identification unit 110*c*, action control unit 112, S16 to S20) identifying the one (vehicle 124*o*) from among the objects interested by the customer from the identified IC tag and guiding the customer to the identified object.

The robot further includes: a map database (108) storing information on a map of the environment; and the object identification implementor moves in the environment to guide the customer to the identified object (vehicle 124*o*) in accordance with the stored map information.

The robot (1) comprises a biped robot having a body (3) and a pair of legs (2) connected to the body.

Figure 12:
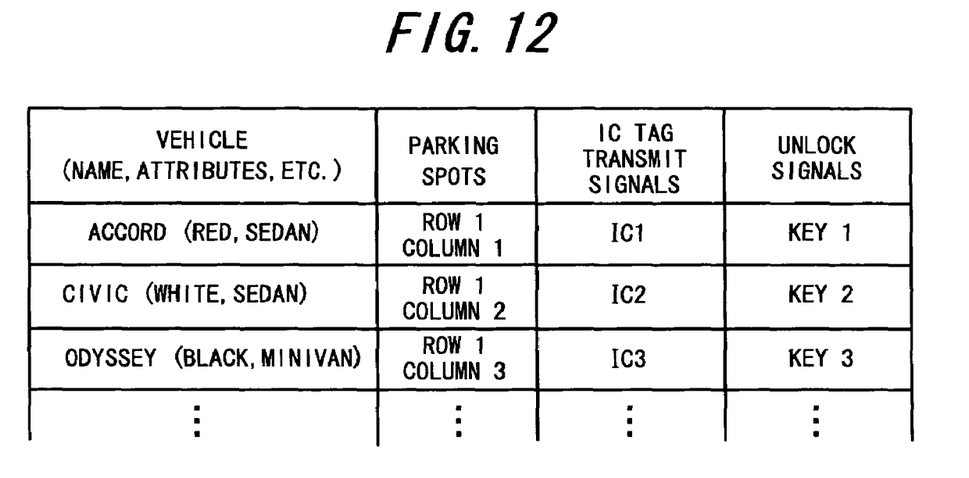
FIG. 12 is a diagram for explaining modifications of the set of unlock signals and the set of IC tag transmit signals stored in the keyless database shown in FIG. 5.

It should be noted in the above, although it has been explained in the foregoing that the signal sets are stored in the keyless database 144 in association with the names and attributes of the vehicles 124 and the location of the vehicle 124*o* is recognized by image recognition, it is instead possible to assign each vehicle 124 a designated parking spot and, as shown in FIG. 12, store the set of signals in the keyless database 144 in association with the parking spots (each defined, for example, by its row n and column m) as well as the names and attributes of the vehicles. This enables the vehicle 124*o* of interest to be specified with still greater exactness.

It should also be noted in the above that, although the vehicles 124 parked in the parking lot 122 of an auto dealer have been taken as an example of lock-equipped objects requiring key management in the foregoing, this invention is not limited to application to vehicles but can be similarly applied to safe deposit boxes, apartments and lock-equipped objects of any kind requiring management of a large number of keys.

It should further be noted in the above that, although the keyless entry device 7 has been explained as being built into the robot 1 in the foregoing, it is instead possible for it to be held in one of the hands 40 of the robot 1.

It should further be noted that, although a biped robot has been taken as an example of the invention robot in the foregoing, the robot is not limited to a biped robot and can instead be a robot with three or more legs and is not limited to a legged mobile robot but can instead be a wheeled or crawler-type robot.

Japanese Patent Application No. 2004-193755 filed on Jun. 30, 2004, is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A customer service robot moving around a surrounding environment and enabling a customer service including key management with respect to a plurality of lock-equipped objects in the environment, comprising:
    an unlock/lock signal database storing unlock/lock signals respectively set for the objects;
    an object identification implementor recognizing an instruction of a customer and identifying one from among the objects which the customer wants unlocked/locked;
    an unlock/lock signal retriever retrieving one from among the unlock/lock signals, stored in the unlock/lock signal database, that is corresponding to the one from among the objects which the customer wants unlocked/locked; and
    an unlock/lock signal transmitter transmitting the retrieved signal to unlock/lock the identified object.

2. The robot according to claim 1, wherein the object identification implementor includes:
    a voice recognition unit recognizing a voice instruction of the customer;
    and recognizes the instruction of the customer and identifies the one from among the objects which the customer wants unlocked/locked.

3. The robot according to claim 2, wherein the object identification implementor includes:
    an IC tag signal database storing IC tag signals transmitted by IC tags placed in the objects;
    an IC tag signal retriever retrieving one from among the IC tag signals, stored in the IC tag signal database, that is estimated to be corresponding to the one from among the objects which the customer wants unlocked/locked from the recognized voice instruction of the customer; and
    an IC tag identification implementor identifying one from among the IC tags that transmits a signal corresponding to the retrieved IC tag signal;
    and identifies the one from among the objects which the customer wants unlocked/locked from the identified IC tag.

4. The robot according to claim 1, further including:
    a map database storing information on a map of the environment; and
    the object identification implementor moves in the environment to identify the one from among the objects which the customer wants unlocked/locked in accordance with the stored map information.

5. The robot according to claim 1, wherein the robot comprises a biped robot having a body and a pair of legs connected to the body.

6. A customer service robot moving around a surrounding environment and enabling a customer service with respect to a plurality of objects in the environment, comprising:
    an IC tag signal database storing IC tag signals transmitted by IC tags placed in the objects;
    an IC tag signal retriever recognizing an instruction of a customer and retrieving one from among the IC tag signals, stored in the IC tag signal database, that is estimated to be one from among the objects interested by a customer, from the recognized instruction of the customer;
    an IC tag identification implementor identifying one from among the IC tags that transmits a signal corresponding to the retrieved IC tag signal; and
    an object identification implementor identifying the one from among the objects interested by the customer from the identified IC tag and guiding the customer to the identified object.

7. The robot according to claim 6, further including:
    a map database storing information on a map of the environment; and
    the object identification implementor moves in the environment to guide the customer to the identified object in accordance with the stored map information.

8. The robot according to claim 6, wherein the robot comprises a biped robot having a body and a pair of legs connected to the body.

* * * * *